US012343919B2

(12) United States Patent
Boor et al.

(10) Patent No.: US 12,343,919 B2
(45) Date of Patent: Jul. 1, 2025

(54) ROOFING TILE SYSTEM AND METHOD OF MANUFACTURE

(71) Applicant: Wildhawk Investments, LLC, Washington, IA (US)

(72) Inventors: Billibob Boor, Neenah, WI (US); Gerald Edson, Terra Haute, IN (US)

(73) Assignee: Wildhawk Investments, LLC, Washington, IA (US)

( * ) Notice: Subject to any disclaimer, the term of this patent is extended or adjusted under 35 U.S.C. 154(b) by 0 days.

(21) Appl. No.: 18/449,283

(22) Filed: Aug. 14, 2023

(65) Prior Publication Data

US 2023/0383541 A1 Nov. 30, 2023

Related U.S. Application Data

(62) Division of application No. 16/891,218, filed on Jun. 3, 2020, now abandoned.
(Continued)

(51) Int. Cl.
*B29C 48/285* (2019.01)
*B01F 25/313* (2022.01)
(Continued)

(52) U.S. Cl.
CPC .......... *B29C 48/297* (2019.02); *B01F 25/313* (2022.01); *B29B 7/603* (2013.01);
(Continued)

(58) Field of Classification Search
CPC ......... B29B 7/244; B29B 7/603; B29B 7/606; B29C 48/175; B29C 48/297;
(Continued)

(56) References Cited

U.S. PATENT DOCUMENTS 3,871,611 A 3/1975 Taketa
4,021,022 A * 5/1977 Satterfield, III .......... B29B 7/60
366/127
(Continued)

FOREIGN PATENT DOCUMENTS

DE 3217496 C2 9/1989
DE 102008007544 A1 8/2009
(Continued)

*Primary Examiner* — Atul P. Khare
(74) *Attorney, Agent, or Firm* — Nyemaster Goode, P.C.

(57) ABSTRACT

A synthetic roofing tile is provided that includes features enhancing the impact resistance as well as the ease of installation and/or use of the roofing tile or panel on a building structure. The roofing tile is formed in an improved color variation process which effectively simulates the appearance of the natural material represented by the synthetic roofing tile. The roofing tile also can be compression molded such as in a method for manufacturing a synthetic roofing tile or panel is provide in which a number of inserts representing the desired appearance for the roofing tile or panel can be utilized in the manufacturing process to provide roofing tiles or panels with the desired appearance. The inserts can be interchanged within the molds in order to provide different appearances to roofing tiles or panels formed using the same molds.

16 Claims, 10 Drawing Sheets

Related U.S. Application Data

(60) Provisional application No. 62/856,248, filed on Jun. 3, 2019.

(51) Int. Cl.
| | | |
|---|---|---|
| *B29B 7/60* | (2006.01) | |
| *B29B 11/10* | (2006.01) | |
| *B29C 48/07* | (2019.01) | |
| *B29C 48/17* | (2019.01) | |
| *B29C 33/30* | (2006.01) | |
| *B29C 43/02* | (2006.01) | |
| *B29C 43/18* | (2006.01) | |
| *B29C 43/36* | (2006.01) | |
| *B29C 48/00* | (2019.01) | |
| *B29K 23/00* | (2006.01) | |
| *B29K 105/00* | (2006.01) | |
| *B29K 509/00* | (2006.01) | |
| *B29L 31/10* | (2006.01) | |
| *E04D 1/08* | (2006.01) | |
| *E04D 1/20* | (2006.01) | |
| *E04D 1/26* | (2006.01) | |

(52) U.S. Cl.
CPC ............. *B29B 11/10* (2013.01); *B29C 48/07* (2019.02); *B29C 48/175* (2019.02); *B29C 33/306* (2013.01); *B29C 43/021* (2013.01); *B29C 43/18* (2013.01); *B29C 2043/3602* (2013.01); *B29C 2043/3671* (2013.01); *B29C 48/0011* (2019.02); *B29K 2023/0633* (2013.01); *B29K 2023/065* (2013.01); *B29K 2105/0032* (2013.01); *B29K 2105/0044* (2013.01); *B29K 2509/00* (2013.01); *B29L 2031/108* (2013.01); *E04D 1/08* (2013.01); *E04D 1/20* (2013.01); *E04D 1/26* (2013.01)

(58) Field of Classification Search
CPC ........... B29C 2948/92828; B29C 2948/92333; B29K 2105/0032; B01F 25/313; B01F 25/3131; B01F 25/3132; B01F 25/31324; B01F 25/31321; B01F 25/31323; B01F 25/31322

See application file for complete search history.

(56) References Cited

U.S. PATENT DOCUMENTS

| | | |
|---|---|---|
| 4,028,450 A | 6/1977 | Gould |
| 4,614,630 A | 9/1986 | Pluim, Jr. |
| 4,787,190 A | 11/1988 | Papsdorf |
| 5,110,521 A * | 5/1992 | Moller ................. B01F 35/881 366/156.1 |
| 5,536,463 A | 7/1996 | Baccman |
| 6,248,271 B1 | 6/2001 | Graham et al. |
| 6,402,363 B1 * | 6/2002 | Maguire ............... B29C 48/288 177/184 |
| 6,495,635 B1 | 12/2002 | Edson |
| 6,558,773 B2 | 5/2003 | Edson |
| 6,703,440 B2 | 3/2004 | Edson |
| 6,706,366 B2 | 3/2004 | Meyer et al. |
| 7,331,150 B2 | 2/2008 | Martinique |
| 7,596,919 B1 | 10/2009 | Vande Hey et al. |
| 7,845,141 B2 | 12/2010 | Martinique |
| 8,153,045 B2 | 4/2012 | Boor |
| 8,245,378 B2 | 8/2012 | Dean |
| 8,590,270 B2 | 11/2013 | Martinique |
| 9,796,123 B2 * | 10/2017 | Maguire ............... B29C 48/286 |
| 2003/0175449 A1 | 9/2003 | Edson |
| 2004/0206246 A1 | 10/2004 | Bortone et al. |
| 2004/0241476 A1 | 12/2004 | Friedman et al. |
| 2005/0153103 A1 | 7/2005 | Meyer et al. |
| 2006/0026908 A1 | 2/2006 | Gregori et al. |
| 2006/0103045 A1 * | 5/2006 | O'Brien-Bernini .......... B29C 48/022 264/45.9 |
| 2006/0205846 A1 * | 9/2006 | Spitz ........................ C08J 3/201 524/13 |
| 2007/0078191 A1 * | 4/2007 | Guhde .................. C08J 9/0066 521/99 |
| 2008/0003321 A1 | 1/2008 | Kerr et al. |
| 2009/0000222 A1 | 1/2009 | Kalkanoglu et al. |
| 2009/0308009 A1 | 12/2009 | Boor |
| 2011/0185665 A1 | 8/2011 | Allen et al. |
| 2013/0026337 A1 | 1/2013 | Svensson |
| 2013/0028999 A1 * | 1/2013 | Thewes ................. B29C 48/385 425/131.1 |
| 2013/0263526 A1 | 10/2013 | Thomas et al. |
| 2014/0186479 A1 | 7/2014 | Ayotte et al. |
| 2019/0091895 A1 | 3/2019 | Knappworst et al. |

FOREIGN PATENT DOCUMENTS

| | | | | |
|---|---|---|---|---|
| EP | 1457307 A2 | 9/2004 | | |
| EP | 1457307 A3 | 2/2006 | | |
| EP | 1961537 A2 | 8/2008 | | |
| FR | 2562832 A1 | 10/1985 | | |
| KR | 200372456 Y1 * | 1/2005 | ............. | B29C 48/92 |
| WO | WO-2019118361 A1 * | 6/2019 | ............. | B29C 49/04 |

* cited by examiner

ROOFING TILE SYSTEM AND METHOD OF MANUFACTURE

CROSS-REFERENCE TO RELATED APPLICATIONS

The present application is a division of U.S. patent application Ser. No. 16/891,218 titled Roofing Tile System And Method Of Manufacture, filed on Jun. 3, 2020, which claims priority from U.S. Provisional Patent Application Ser. No. 62/856,248, titled Roofing Tile, filed on Jun. 3, 2019, the entirety of which are hereby expressly incorporated herein by reference for all purposes.

FIELD OF THE DISCLOSURE

The present disclosure relates generally to roofing materials, and more specifically to a roofing tile formed of a synthetic material that simulates a roofing shingle or tile formed of a natural material, a roofing system including the roofing tiles and method of forming thereof.

BACKGROUND OF THE DISCLOSURE

In building construction, the roof of the structure must be capable of not only protecting the interior of the structure from the elements, but also to provide this protection with the desired aesthetic appearance. Historically a number of different roofing materials have been employed to achieve these purposes, such as asphalt shingles, wood shingles, ceramic tiles, and slate tiles, among others. However, while these materials are effective in providing weather protection with the desired appearance, the natural roofing materials often are deficient in durability aspects that require frequent maintenance, repair and/or replacement of the natural roofing materials.

With the advent of modern material processing techniques, it has become possible to manufacture roofing materials from synthetic materials that have greatly increased durability aspects in comparison with these natural materials and maintain the desired aesthetic appearance of the natural materials. Examples of synthetic roofing materials of this type are disclosed in U.S. Pat. Nos. 6,495,635; 6,558,773; 6,703,440; 6,706,366; 7,596,919; and 8,153,045, each of which is expressly incorporated herein by reference in its entirety.

Nevertheless, while these prior art references disclose various configurations for roofing tiles formed from synthetic materials, each has certain shortcomings with regard to overall structure or manufacturing process. As such, it is desirable to develop a roofing tile formed from one or more synthetic materials that addresses and overcomes the shortcomings of the prior art and/or to provide an improved roofing tile or shingle from those disclosed in the prior art.

SUMMARY OF THE DISCLOSURE

According to one aspect of an exemplary embodiment of the disclosure, an improved color variation process is provided with regard to the method of manufacture of a synthetic material roofing tile or shingle or other exterior or interior building panel, such as siding, in order to effectively simulate the appearance of the natural material represented by the synthetic roofing tile produced in the method.

According to another aspect of an exemplary embodiment of the disclosure, a synthetic roofing tile, shingle or panel is provided that includes one or more features enhancing the ease of installation and/or use of the roofing tile, shingle or panel on a building structure.

According to still another aspect of an exemplary embodiment of the present disclosure, a synthetic roofing tile, shingle or panel is formed utilizing a material formulation that significantly improves the impact resistance and other desirable properties of the roofing tile, shingle or panel.

According to a further aspect of an exemplary embodiment of the present disclosure, a method for manufacturing a synthetic roofing tile, shingle or panel is provided in which the synthetic roofing tile, shingle or panel can be compression molded.

According to still a further aspect of an exemplary embodiment of the present disclosure, a method for manufacturing a synthetic roofing tile, shingle or panel is provided in which a number of inserts representing the desired appearance for the roofing tile, shingle or panel can be utilized in the manufacturing process to provide roofing tiles, shingles or panels with the desired appearance. The inserts can be interchanged within the molds in order to provide different appearances to roofing tiles, shingles or panels formed using the same molds.

Numerous additional aspects, features and advantages of the present disclosure will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

Figure 1:
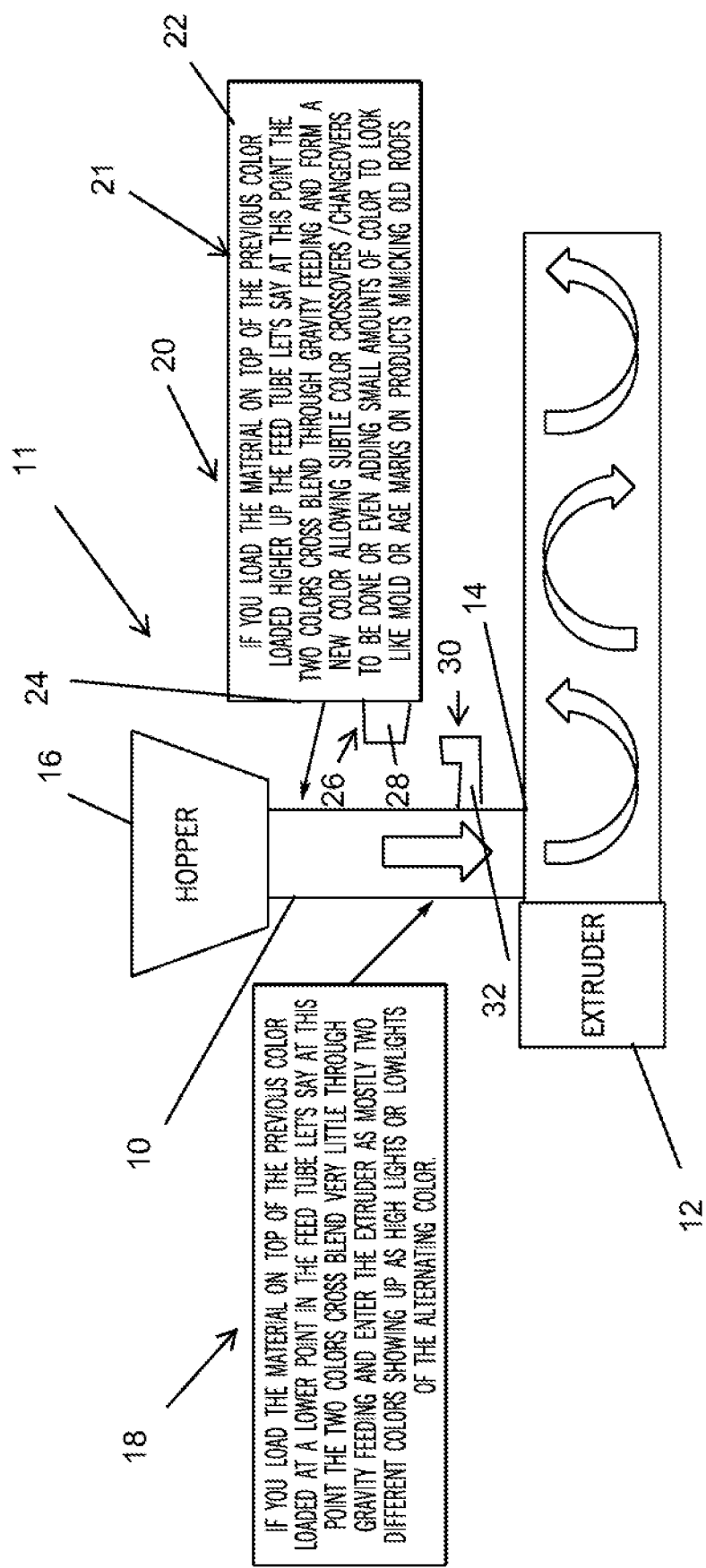
FIG. 1 is schematic view of a first exemplary embodiment of a color variation process for use as part of a manufacturing process for forming a synthetic roofing tile, shingle or other building panel according to the present disclosure.

With reference now to the drawing figures in which like reference numerals designate like parts throughout the disclosure, FIGS. 1-4 schematically represent variations of different color variation process for use as part of methods of forming roofing tiles, shingles or building panels having desired color characteristics for use as part of methods of manufacturing roofing tiles in accordance with the present disclosure.

Color Variation Processing

The color variation processes or methods schematically illustrated in FIGS. 1-4 are new and unique to the roofing and building product industry. They have never been used for composite roofing or siding, nor in injection or compression molded processes.

The processes presently disclosed, alone or in combination with other aspects of building and/or roofing products/material manufacturing, such as the particular molding process employed and/or the mold design, among others, aid in eliminating the pattern effect previously offset in the relevant prior art by utilizing the mold volume calculation method. The processes presently disclosed additionally add further abilities to the formation of the building products with color development providing a finished look to the resulting roofing tile or shingle or building panel, such as siding. In utilizing the novel processes disclosed herein, and illustrated in exemplary embodiments in FIGS. 1-4, it has been possible to take colors of real wood from existing roofs, match those base colors as individual components, and then look at the overall roof pattern from a photograph and mimic the color look by adjusting those solid colors in the disclosed processes as they run through the machine, e.g., the extruder 12. This is done in the disclosed processes by varying how much color is added at one time, and/or how far down the feed throat 10 of the extruder 12 the color moves before feeding the next color to the mixture. The amount of material being placed in the extruder 12 to achieve the color hue desired and also how far down the feed throat 10 we allow the material to flow before adding the next color affects the overall blending and visual perception of the color seen in the end product. For example, if we load the first color material high in the feed throat 10 and then place another color directly on top of the first, the two materials will immediately begin to blend with each other as they go down the feed throat 10 creating a new color hue between the two of them. If the first color material is loaded further toward the bottom of the feed throat 10 before placing the next color material on top of it you a more drastic division of the colors as they have less time to mix so as they exit the extruder 12 they resemble a highlight or lowlight affect in the end product.

For example, while the colors yellow and blue together make green, if a yellow color material and then blue color material added on top are initially added high in the feed throat 10 then end affect in the end product will be some yellow, the same amount of green as the yellow material and blue material are well mixed in the feed throat 10, and then blue will come out. If we load yellow and then blue on top lower in the feed tube you will see clean yellow come out, then very little green hue at all due to the limited mixing of the yellow and blue, and then blue almost as if the materials were painted separate colors. It is possible to adjust these color loadings to have whatever color effect we want for the end product thus providing the ability to match almost any natural color look of historical slates and wood roofs and/or sidings with very little effort or cost. With this discussion providing the general aspects of the improved color variation process aspect of the present invention, the following is a discussion of a number of exemplary embodiments of the implementation of the color variation process.

Method 1: As shown in the exemplary illustrated embodiment of FIG. 1, the device 11 for mixing the materials utilized in the formation of the building product/roofing tile/shingle/siding 100 is schematically illustrated. The device 11 includes the feed throat 10 that is attached to an inlet 14 of an extruder 12 at one end and that supports a hopper 16 at the opposite end. The hopper 16 is primarily utilized for the addition of the non-color materials, such as the recycled materials hereinafter specified for the various building component compositions, utilized in the manufacture of the building products 100 (FIG. 5) of the present disclosure, but may additionally be used for the addition of certain color materials. The materials added in the hopper 16, which can be added to the hopper 16 in any form, such as powders or pellets, among other suitable forms, pass under the influence of gravity through the feed throat 10 to the inlet 14 of the extruder 12, where the materials are mixed by a screw (not shown) present in the extruder 12 and optionally heated prior to exiting the extruder 12 through the outlet 18. The device 11 also includes a number of color feeders 18 and 20 engaged with the feed throat 10. The color feeders 18 and 20 can be secured at various points along the feed throat 10 in order to enable color materials to be added at different points along the length of the feed throat 10. The feeders 18 and 20 can be permanently secured to the feed throat 10, or can be releasably secured to the throat 10. The feeders 18 and 20 are formed similarly to the hopper 16 and has a body 21 formed of a suitable material, such as a metal or hard plastic, among others, that includes an open inlet end 22 into which the selected color material can be introduced and an outlet end 24 that dispenses the color material from the feeder 18 and/or 20 into the throat 10. The outlet end 24 is aligned with a suitable opening (not shown) in the feed throat 10 to enable the color material to pass into the interior of the throat 10. For releasably securing the feeder 18 and/or 20 to the throat 10 in alignment with the opening in the throat 10, any suitable mechanism can be employed. For example, the outlet end 24 of the feeder 18 and/or 20 can be formed to be smaller than the opening in the feed throat, such that the outlet 24 is inserted through the opening into the interior of the throat 10. The body 21 can include a mechanical device 26, such as a bracket 28, that is engaged with a complementary structure 30, such as a hook 32, on the exterior of the throat 10 in order to retain the feeder 18 and/or 20 on the throat 10 in alignment with the opening.

In these configurations, gravity operates to draw the color material from the body 21 of the feeders 18 and/or 20 into the throat 10 for mixing with the remainder of the material(s) used in forming the end product 100 and the other color materials. In one exemplary embodiment, the color material is added in the form pre-colored pellets (not shown), which are completely formed finished material of various colors, in stages to achieve the desired coloration or pattern effect for the end product. In an alternative embodiment, a non-pelleted dry color mix or powder can also be dispensed from the feeders 18 and/or 20 in the same gravity feed manner as the pellets.

Benefits of Method 1:

Providing customized color pattern or appearance in building products using pre-colored pelletized or powdered material with a sequencing method in which powder colorant or colored pellet is introduced into the manufacturing process for the building product at the throat of the mixing machine/extruder without the need of mold volume calculations to reduce patterns Implementation of the process of material flow color variation with layering of the materials to achieve the desired color output.

Figure 2:
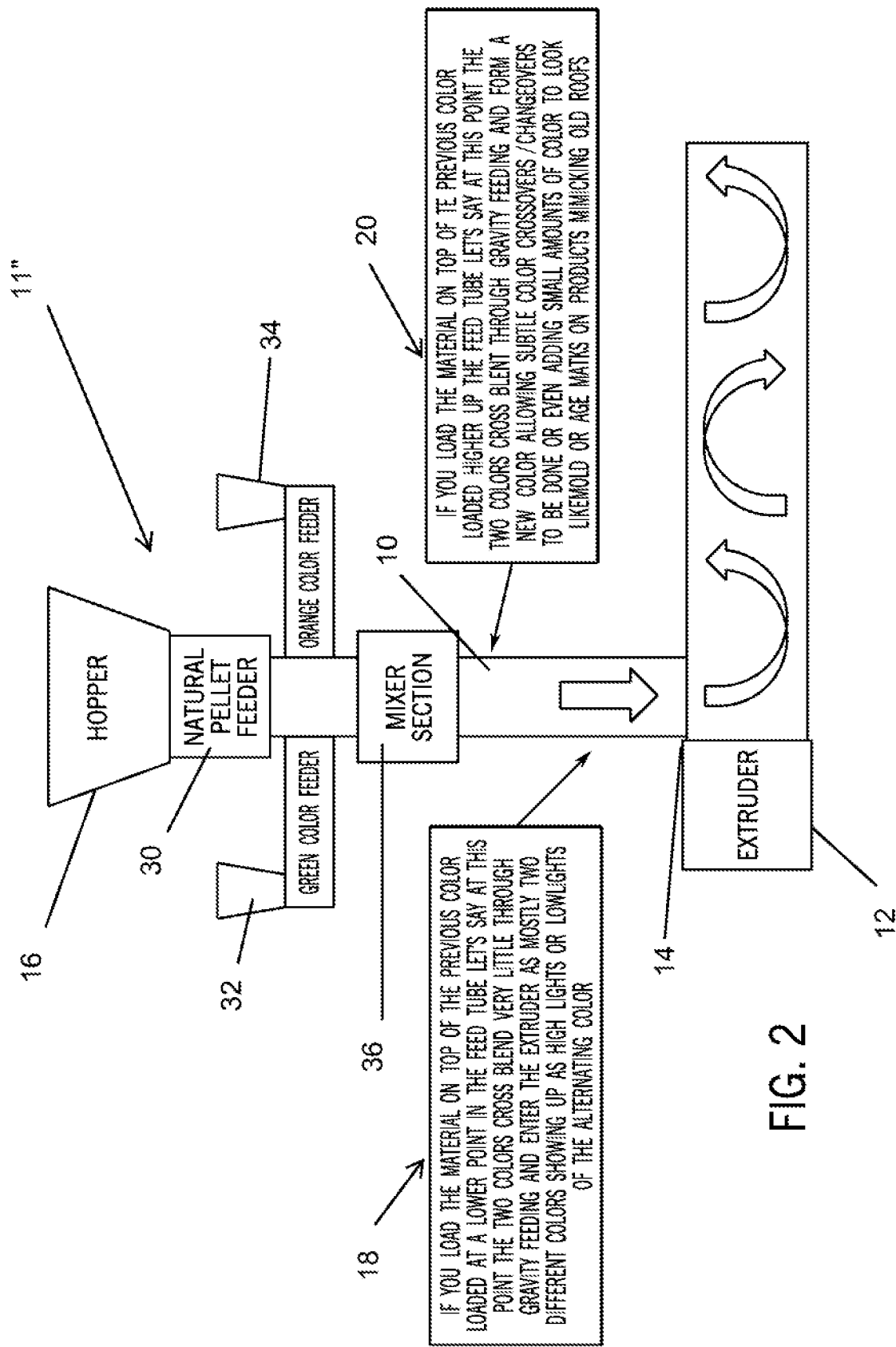
FIG. 2 is schematic view of a second exemplary embodiment of a color variation process for use as part of a manufacturing process for forming a synthetic roofing tile, shingle or other building panel according to the present disclosure.

As shown in the exemplary illustrated embodiment of FIG. 2, method 2 involves an apparatus/addition to method 1 still utilizing the overall process of method 1 shown in FIG. 1, but using non-colored, natural pellets, color feeders, and a mixing section. The idea of using non-colored pellets, which have the same composition as the colored pellets but without the colored oxides, allows for better inventory control as it can be turned to any color throughout the process, whereas pre-colored pellets can only provide the color initially provided to the pre-colored pellet. Thus, it is often undesirable to have to maintain inventory stocks of all pre-colored pellets, when some colors may be utilized seldomly, if at all, resulting in a significant amount of dead inventory for the low demand colors. The use of non-colored pellets greatly reduces this problem by allow inventory to be reduced to the non-colored pellets and the various color materials or charges, again having the same composition as the colored pellets or materials or charges but without the colored oxides enabling manufacturers to more constantly flip material inventory and to react to orders quickly.

In the device 11' of FIG. 2, the modifications made to the device 11 of FIG. 1 include the positioning of a non-colored pellet feeder 30 below the hopper 16. The device 11' also includes a pair of color charges 32 and 34 attached to the throat 10 below the feeder 30 to introduce the colors into the throat 10, and a mixer 36 disposed below the color charges 32 and 34 to mix the colors from the charges 32 and 34 with the non-colored pellets and the other materials used to form the building components 100 added into the hopper 16, and described previously. The feeder 30 and/or charges 32 and 34 turn on and off through sensors that can tell when the feed throat 10 is emptying of the materials. The metering is then done through timing via a computer (not shown) but operably connected to the feeder 30 and/or charges 32 and 34. The colors and other materials can be retained in the mixer 36 for an amount of time prior to moving into the remainder of the throat, and/or can be continuous through the mixer 36. For example, if the device 11' or extruder 12 slows down, consequently slowing the flow of material into the inlet 14 of the extruder 12, the computer (not shown) can slow down the flow through the mixer 36 to match or pause feed rates. But all blending or mixing of the colors is done in the feed throat 10 by gravity.

Below the feeder 30, the color is introduced into the throat 10 from the charges 32 and 34. Depending upon the form of the color material, e.g., a liquid color or a solid color, the charges 32 and 34 can take different forms, such as similar to the feeders 18 and 20 in FIG. 1, or a suitable liquid injection device, secured in a fixed or releasable manner to the exterior of the throat 10.

In operation, the required amount of non-colored pellets and other materials are charged to the hopper 16 of the device 11' to accommodate the run of material for forming the building product(s) 100. After the materials are positioned within the feeder 30, the feeder 30 is operated to dispense the materials into the throat 10. As the volume of non-colored pellets are dropped and/or fed into the mixing section/mixer 36, the color(s) needed for that material run is also introduced into the mixing section 36 at the same time by the color charges 32 and/or 34. The mixer 36 combines the color(s), the non-colored pellets and the other materials in order to achieve the desired color profile for the building product 100, with any residence time of the materials in the mixer 36 being determined by different preset times associated with the desired color and/or look for each shingle or building product 100. When the prior charge of materials and color reaches a particular height within the feed throat 10 below the mixer 36, as monitored by a proximity or level switch (not shown) positioned on the throat 10 below the mixer 36, the mixer 36 dispenses or drops its material charge into feed throat 10 for further processing in the extruder 12. Once the mixer 36 drops the charge held within it, the feeder 30, which has been pre-loaded with additional non-colored pellets and other materials, and the color charges 32 and 34, which have also been pre-loaded with additional color materials, begin loading the materials into the mixer 36 to form the next building product material charge.

Benefits of Method 2:

Usage of non-colored pelleted material with a sequencing method of coloring through powder colorant or colored pellet being introduced into the process at the throat of the machine without the need of mold volume calculations to reduce patterns.

Usage of color feeders/charges and a mixing section to allow for powdered or pelleted colorants where previously pre-batched industry standard color dispersions was the method.

Implementation of the process of material flow color variation with layering of the materials to achieve the desired color output.

Figure 3:
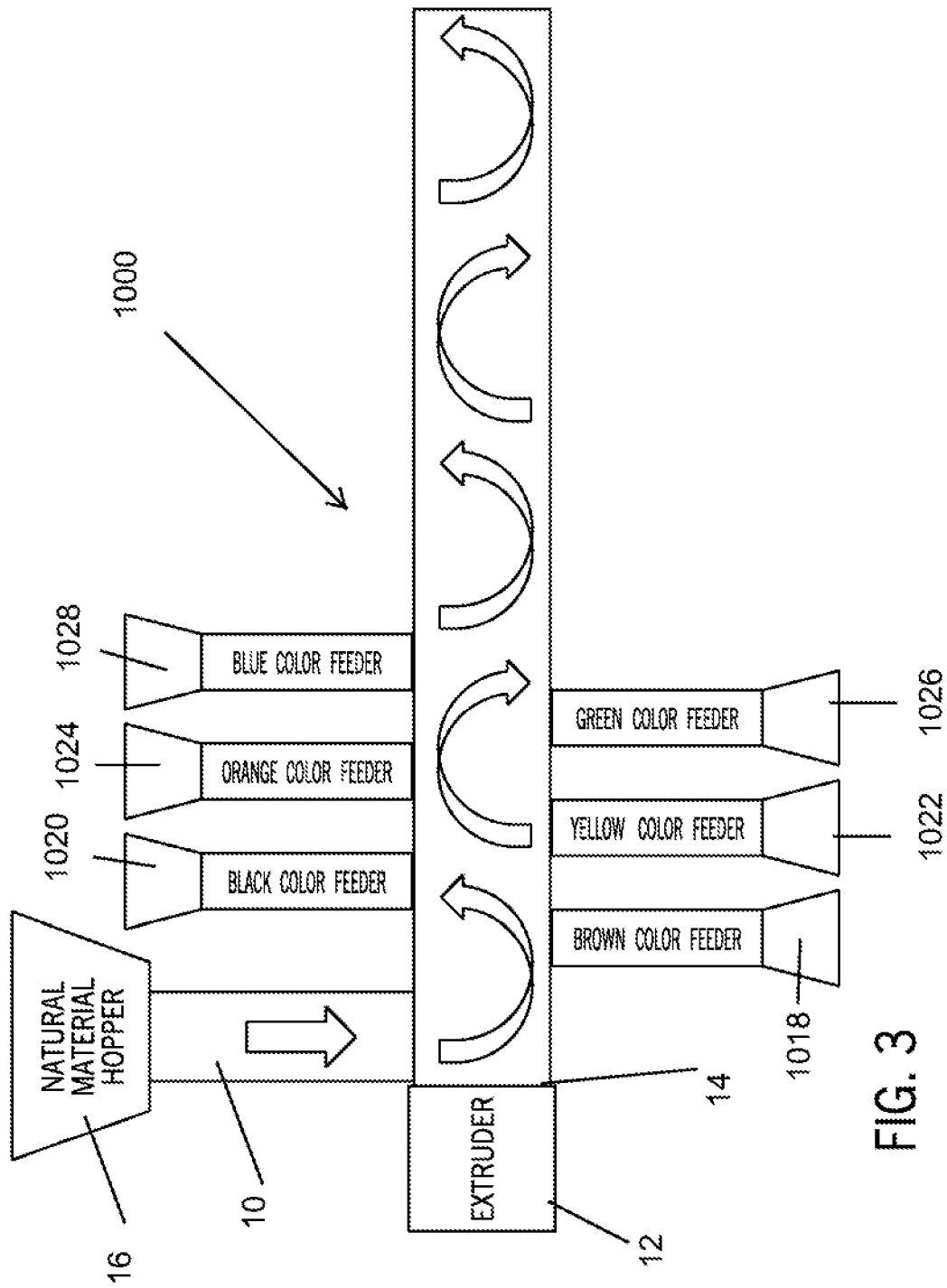
FIG. 3 is schematic view of a third exemplary embodiment of a color variation process for use as part of a manufacturing process for forming a synthetic roofing tile, shingle or other building panel according to the present disclosure.

As shown in the exemplary illustrated embodiment of FIG. 3, method 3 employs a device 1000 including the hopper 16, the throat 10 and the extruder 12. However, instead of the color feeders or charges disposed on the throat 10 as in the prior embodiments, the device 1000 in method 3 has the color feeders 1018-1028 disposed directly on the extruder 12, downstream from the inlet 14 of the extruder 12. non-colored natural pellets or non-pelleted dry mix in the same way. Although dry mix is a bit dustier for manufacturing it does save cost. With this method the natural material is loaded non-metered into the feed throat. As the materials are extruded downstream within the extruder itself color feeders are used to introduce the colors and to control the color pattern or sequence.

Figure 4:
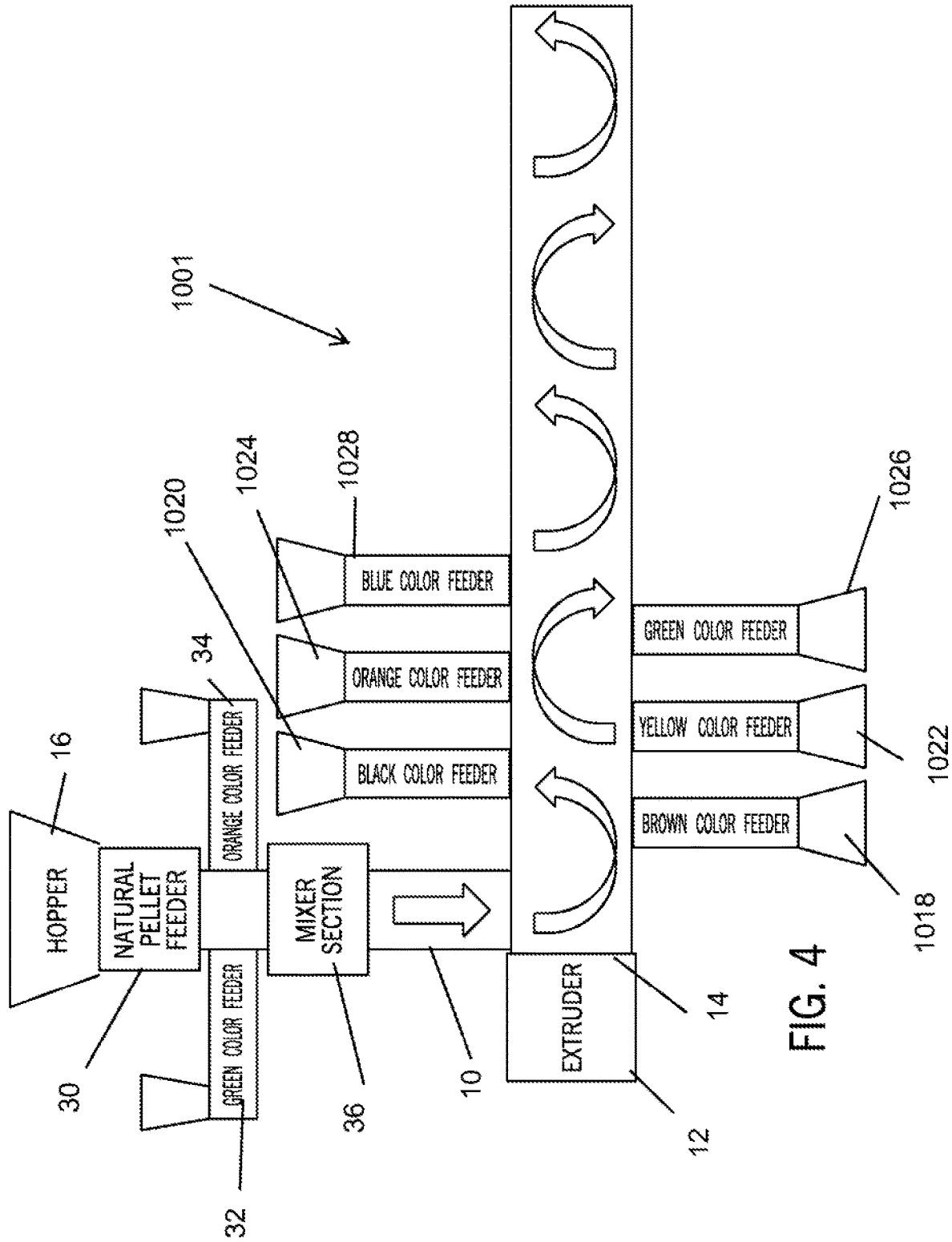
FIG. 4 is schematic view of a fourth exemplary embodiment of a color variation process for use as part of a manufacturing process for forming a synthetic roofing tile, shingle or other building panel according to the present disclosure.

Benefits of Method 3:

1st in composite roofing industry to adapt non-colored pelleted or powdered material to be color sequenced through downstream color feeders on the extruder itself during the shingle manufacturing process allowing for many color variations As shown in the exemplary illustrated embodiment of FIG. 4, method 4 is a device 1001 that is a combination of method 2 and method 3 allowing for many colors and almost infinite versions to be run with subtle changes and drastic highlight/lowlights to be done at the same time.

Benefits of Method 4:

1st in composite roofing industry to adapt non-colored pelleted or powdered material with a sequencing method of coloring through powder colorant or colored pellet being introduced into the process at the throat of the machine without the need of mold volume calculations to reduce patterns as we have overcome that need.

1st in the composite industry to use color feeders and a mixing section to allow for powdered or pelleted colorants where previously pre-batched industry standard color dispersions was the method.

1st in composite roofing industry to adapt downstream color feeders on the extruder itself in conjunction with the throat color feeders during the shingle manufacturing process allowing for many color variations.

1st in composite roofing industry to implement the process of material flow color variation with layering of the materials to achieve the desired color output.

1st in industry to combine methods 2 and 3 giving virtually unlimited color ability with subtle hue changes and drastic low and highlighting at the same time all while sequencing colors to eliminate patterns and to match historical product looks.

With regard to the composition of the roofing tiles of the present disclosure, whether made using the previously described methods or by other methods, the roofing tile includes recycled components, as described in the prior art, and includes a blend of binders as identified below in certain exemplary embodiments. The binder blend is used to manipulate the polymers in the recycled component to achieve the desired characteristics of the material that we want. We can use a wider range of materials and then modify them through the binder blend to achieve the same elevated output performance above the performance of our historical materials. Previously such as the Edson patents EPDM was used an impact modifier of 20 to 30% as rubber to increase impact. The problem is rubber also burns and does not bond to the plastics at the level that we require. We are the first in the composite rooting molding world to be able to utilize these unique components.

TABLE 1

Composition of Spanish Style Roofing Tiles (w/w %)

|  | Class A Fire | Class C Fire |
| --- | --- | --- |
| Mag Hydroxide | 30-45% | 0-20% |
| Calcium 400 mesh particle size or smaller | 5-15% | 25-45% |
| Wollastonite | 1-5% | 1-5% |
| Blend of binders from below | 8-12% | 8-12% |
| Dow Engage Ethylene Octene |  |  |
| Dow Versify Polypropelene |  |  |
| Ethylene copolymer |  |  |
| Dow Affinity Polyolefin Plastomer |  |  |
| Dow Infuse Olefin Block Copolymer |  |  |
| Ethylene vinyl acetate 10-20 melt (10-28% VA Content) | 3-5% | 3-5% |
| LDPE 2-4 melt | 10-15% | 10-15% |
| HDPE 8-15 melt | 20-28% | 20-28% |
| Tinuvin 783 UV | .4% | .4% |
| Chimasorb 81 UV | .2% | .2% |
| Irganox b225 antioxidant | .1% | .1% |
| Talc | 1-10% | 1-10% |

TABLE 1-continued

Composition of Spanish Style Roofing Tiles (w/w %)

|  | Class A Fire | Class C Fire |
| --- | --- | --- |
| LLDPE | 3-19% | 3-19% |
| Zinc Stearate | 0.5-3% | 0.5-3% |
| Balance is colorant |  |  |

TABLE 2

Composition of Slat/Cedar Shake Style Roofing Tiles (w/w %)

|  | Class A Fire | Class C Fire |
| --- | --- | --- |
| Mag Hydroxide | 30-40% | 0-20% |
| Calcium 1000 mesh particle size | 4-10% | 20-45% |
| Wollastonite | 1-5% | 1-5% |
| Blend of binders from below | 22-38% | 22-38% |
| Dow Engage Ethylene Octene |  |  |
| Dow Versify Polypropelene |  |  |
| Ethylene copolymer |  |  |
| Dow Affinity Polyolefin Plastomer |  |  |
| Dow Infuse Olefin Block Copolymer |  |  |
| Ethylene vinyl acetate 10-20 melt (10-28% VA Content) | 5-10% | 5-10% |
| LDPE 2-4 melt | 12-20% | 12-20% |
| HDPE 8-15 melt | 15-18% | 15-18% |
| Tinuvin 783 UV | 0.5% | 0.4% |
| Chimasorb 81 UV | 0.2% | 0.2% |
| Irganox b225 antioxidant | 0.1% | 0.1% |
| Talc | 1-10% | 1-10% |
| LLDPE | 3-19% | 3-19% |
| Zinc Stearate | 0.5-3% | 0.5-3% |

Figure 5:
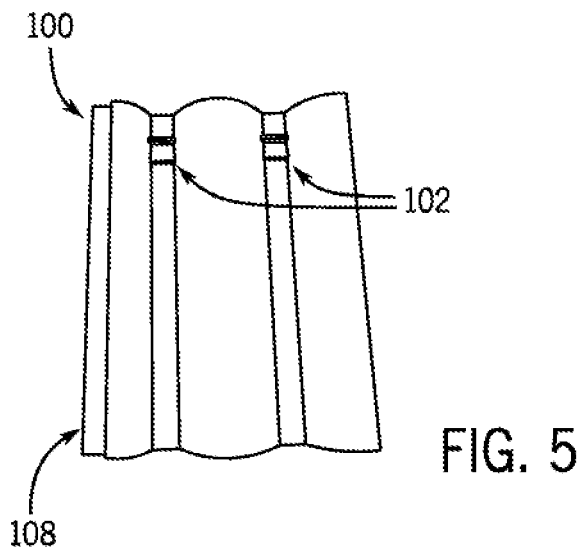
FIG. 5 is a top plan view of a first exemplary embodiment of a roofing tile constructed according to the present disclosure.
Figure 6:
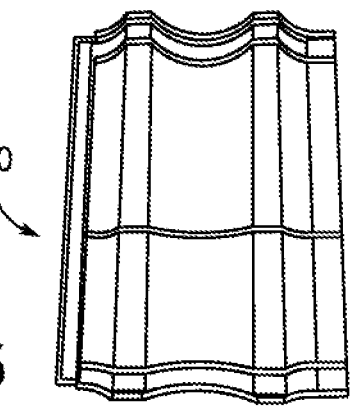
FIG. 6 is a bottom plan view of the roofing tile of FIG. 5.
Figure 7:
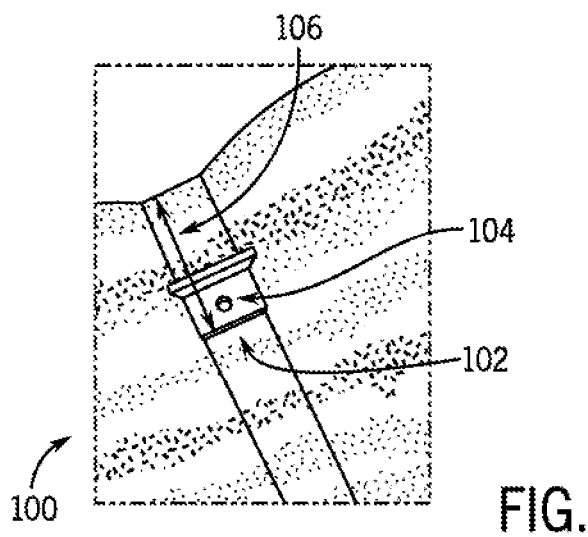
FIG. 7 is a partially broken away top plan view of the roofing tile of FIG. 5.

Referring now to FIGS. 5-7, one exemplary embodiment of a roofing tile 100 formed within the scope of the present disclosure, such as by any of the prior described methods and/or using any of the previously described formulations. The tile 100 does not include preformed nail holes same as required in traditional concrete and clay roofing tiles and other composite tiles. The tile 100 instead can be formed with a nailing area 102 that is raised and thicker to add strength to the area of the tile 100 where the nail (not shown) is to be inserted. The nailing area 102 includes a round nail and screw target 104 formed therein that is self-sealing when the nail or other fastener is inserted therein to avoid damage to the tile 100. Without needing a raised preformed nail hole and/or vertical support ribs as in prior art tiles, the fulcrum can be at a maximum distance from the top of the tile increasing wind performance of the tile 100. The nailing area 102 can additionally be formed with a rib/positioning guide 106 that is used to readily locate the nail or nail gun (not shown) with regard to the target 104 This rib 106 allows an installer to simply abut the nail gun against the rib 106 and pull the trigger to properly insert the nail within the target 104 in the tile 100. The tile 100 can also be formed with an additional third nailing area 108 for additional wind uplift properties.

Benefits of Roofing Tile 100:
1. No Preformed nail holes as with traditional Spanish. Concrete, clay, and previous composite barrel tiles have preformed nail holes due to material limitations. Material performance with product design is unique allowing for the first Spanish tile that is gun nailable without damage. 1st in composites and V in compression molding of Spanish tiles.

2. Raised nail hole pad adding strength to the nail area while keeping the rest of the tile light for material savings. Also doubles as water deflector keeping wind driven water from reaching the nail area.
3. 1st composite barrel tile without raised fixed nail hole allowing for the fulcrum point of the tile to be moved down increasing wind uplift capability.
4. Raised nail gun guide for automatic positioning of nail by guiding the installers nail gun position. Nail guide also serves as a water deflector for wind-driven rain secondary to the gun alignment feature.
5. Material performance allows for lighter yet higher performing product
6. Material performance allows for highest of impact performance without adding rubber or EPDM as a impact modifier like previous materials in the market.
7. Third nail hole in bottom left rain track. 1st in and tile. 1st in composites, 1st in compression molding. This allows for a hidden fastener that increases wind uplift without compromising product water shedding performance.
8. 1st ever to achieve this shape of Spanish tile in the composite market either through injection or compression molding.
9. 1st ever barrel design allowing fasteners to penetrate through the material self-sealing around the nail helping to eliminate leaks and to increase wind uplift performance.
10. For hand nailing and screwing a Nail and screw target location identified with an indented "circle" is on the tile marking fastener location.

Process of Manufacture for Tile of FIGS. 5-7:
If color variation is desired the color process method 1-4 will be used
Utilizes ultra-fine particle fillers to aid in impact and strength
Utilizes proprietary binder material blend adding to strength and performance.
Material is a new and unique formulation never having been produced or sold before.

Figure 8:
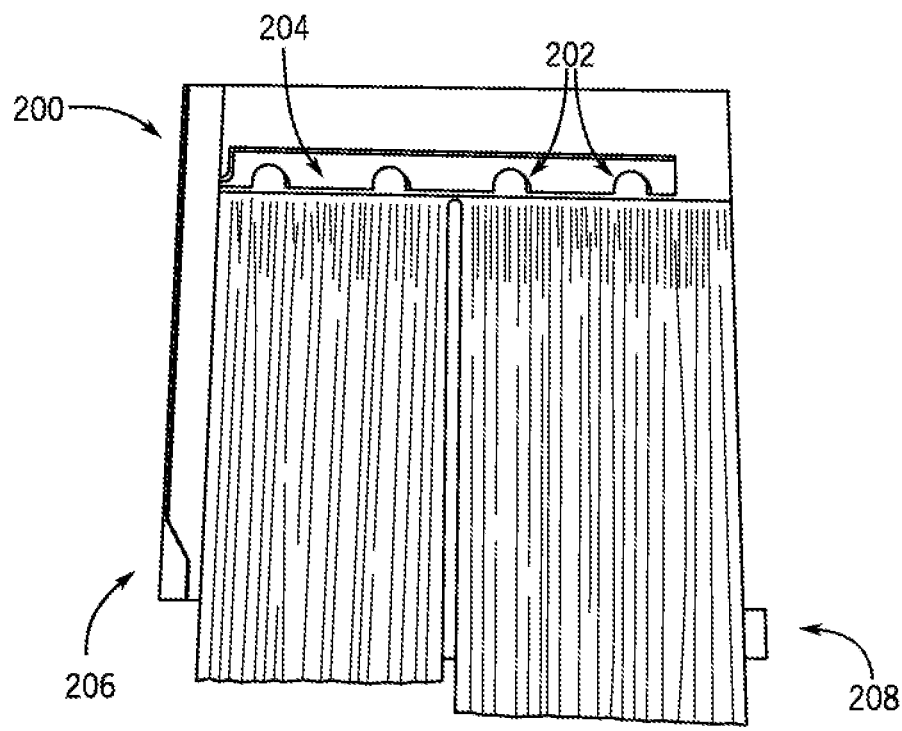
FIG. 8 is a top plan view of a second exemplary embodiment of a roofing tile constructed according to the present disclosure.
Figure 9:
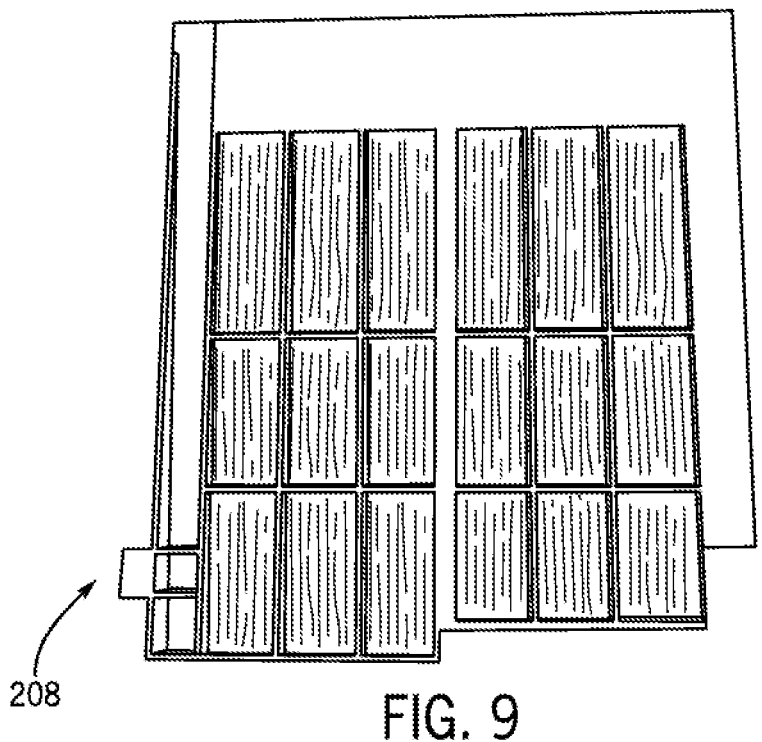
FIG. 9 is a bottom plan view of the roofing tile of FIG. 8.
Figure 10:
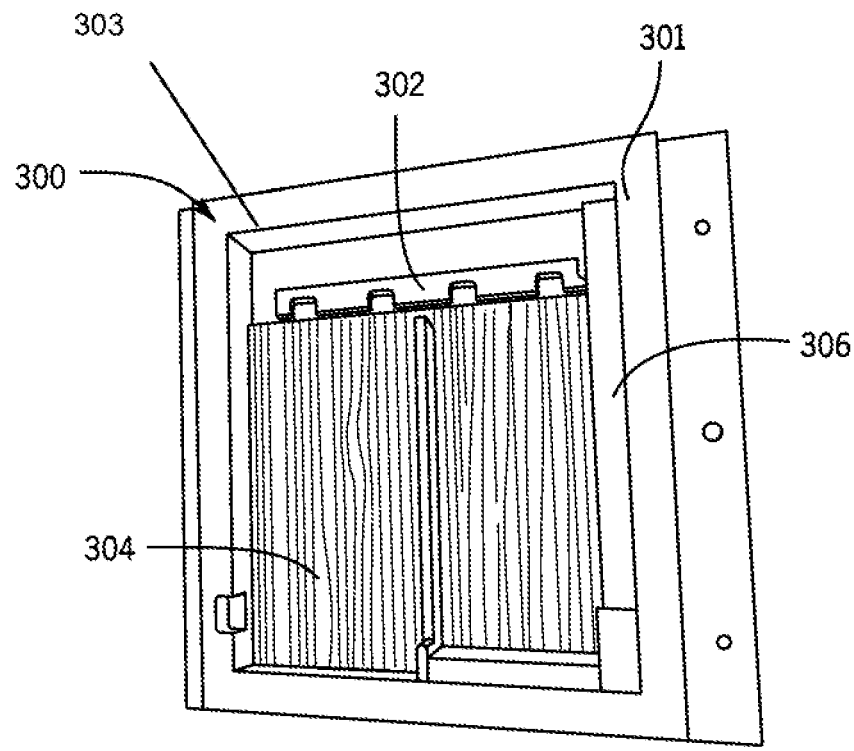
FIG. 10 is a perspective view of a lower mold and inserts utilized therein in constructing a roofing tile according to the present disclosure.
Figure 11:
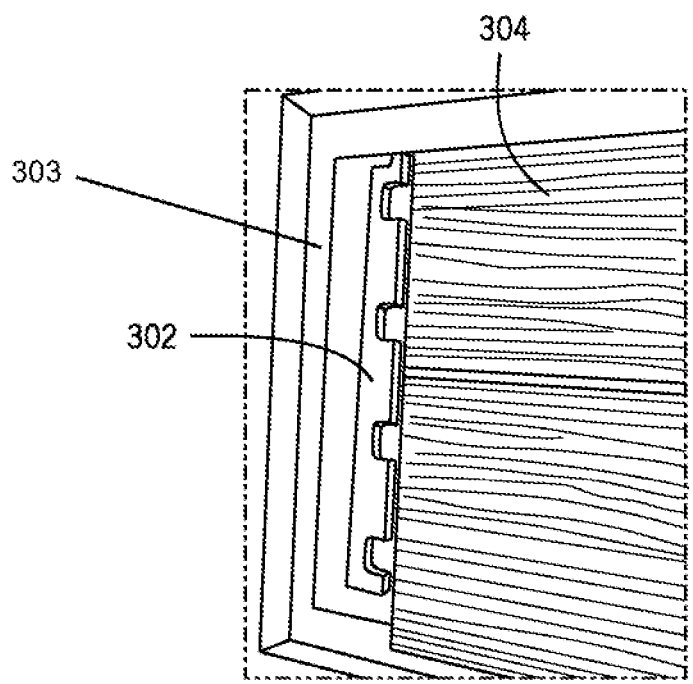
FIG. 11 is a partially broken away, perspective view of the lower mold inserts of FIG. 10.

Referring now to FIGS. 8-9, another exemplary embodiment of a tile 200 constructed according to the present disclosure is illustrated. This tile 200 is formed with an appearance approximating a shake, slate, concrete or other flat material for a natural roofing tile and can be formed by any of the prior described methods and/or using any of the previously described formulations. The tile 200 includes solid from top to bottom fastener locations 202, an integral water drain channel 204, a water lock nail location 206 and an under tuck tab 208.

Further, referring now to FIGS. 10-17, in manufacturing the tile 200 the use of a compression molding process as described previously, or optionally an injection molding process or other suitable forming process, enables different inserts 302-306 to be placed within a cavity 301 formed in a mold 300 for the tile 200 in order to provide different appearances to the tile 200 without having to utilize entirely different molds. As shown in FIGS. 10-11 and 15-17, the mold 300 includes a cavity 301 in which inserts 302, 303, 304 and 306 are placed. The insert 302 assists in forming the fastener locations 202 and drain channel 204, the insert or side rail 303 are interchangeable allowing them, along with the other inserts 302, 304 and 306 to be quick changed for repairs and/or tile style modifications which provides longer wear for the inserts 302-306, the insert 304 provides the desired appearance to the tile 200, and the insert 306 assists in forming the water lock nail location 206. The inserts 302-306 can be removed and interchanged with one another to provide the desired appearance and functionality to the resulting tile 200, without having to provide an entirely different mold 300.

Figure 12:
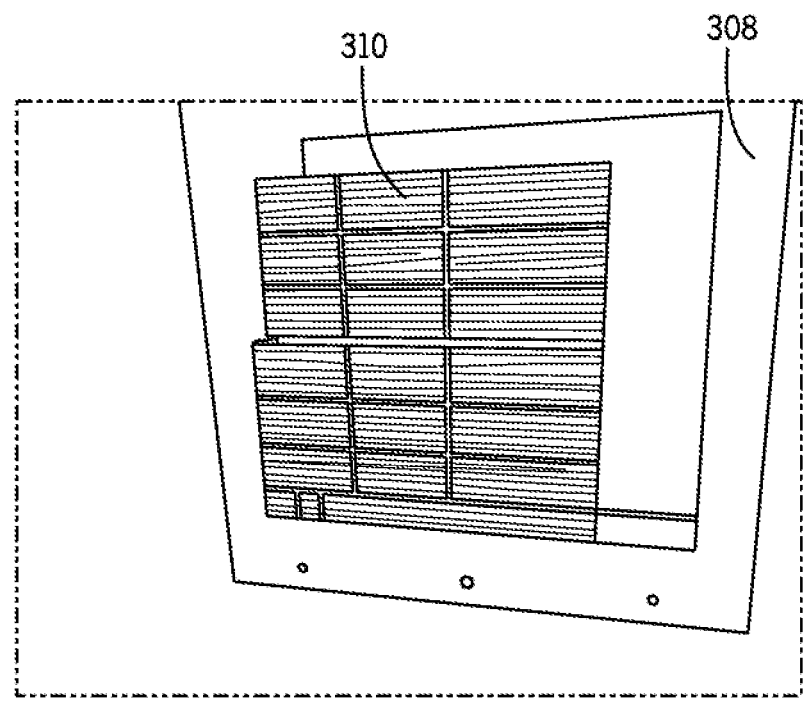
FIG. 12 is a perspective view of a cover and cover insert for the mold of FIG. 10.
Figure 13:
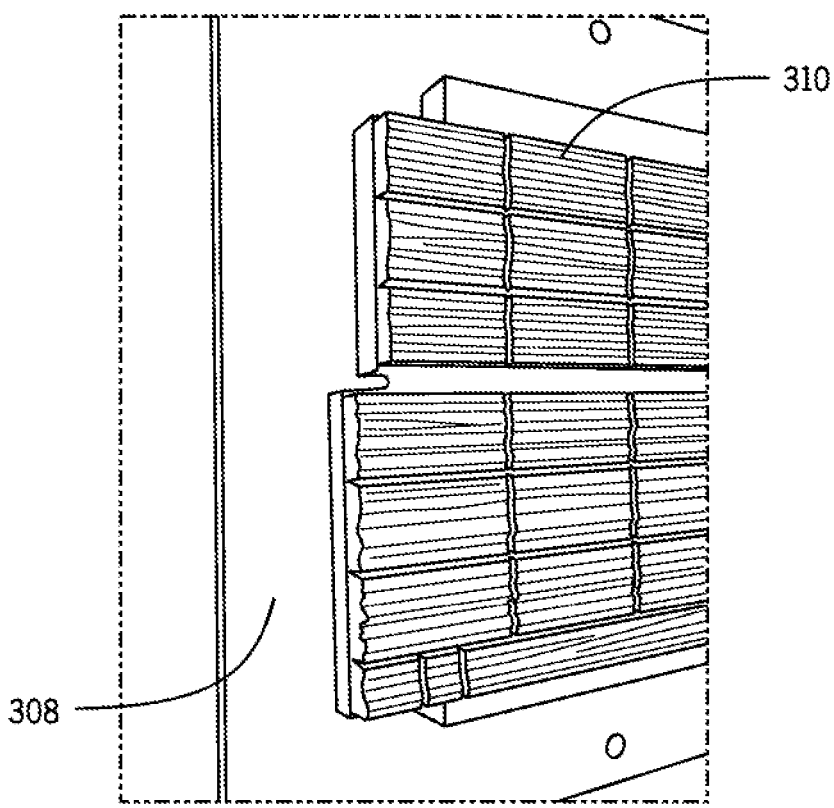
FIG. 13 is a partially broken away, perspective view of the cover of FIG. 13.
Figure 14:
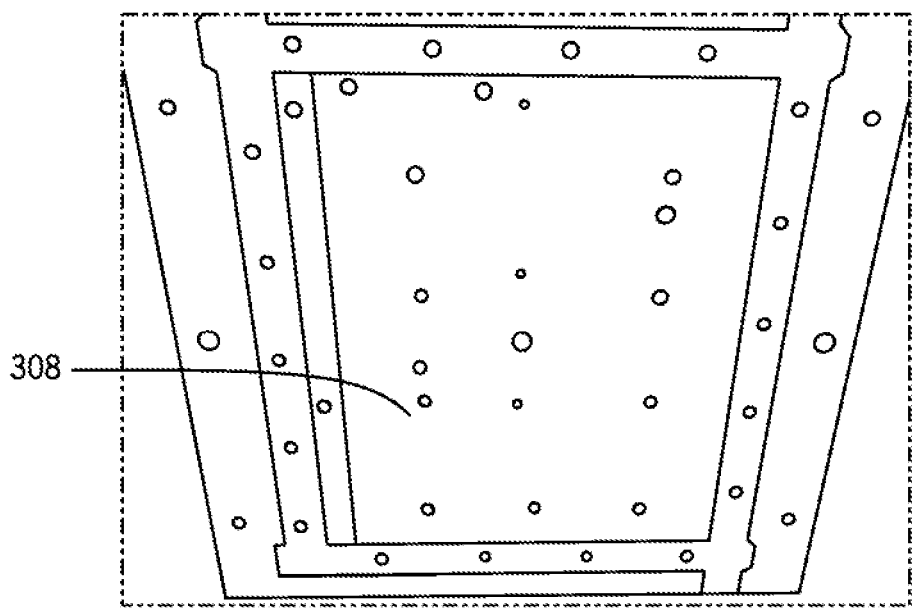
FIG. 14 is a perspective view of the cover of FIG. 12 with the cover insert removed.
Figure 15:
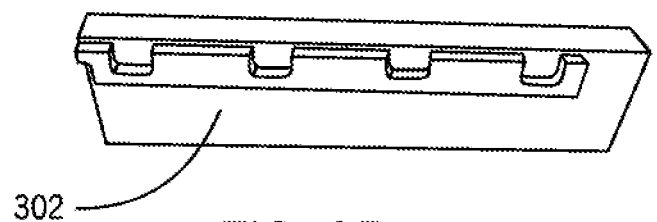
FIG. 15 is a perspective view of a component insert of the mold of FIG. 10.
Figure 16:
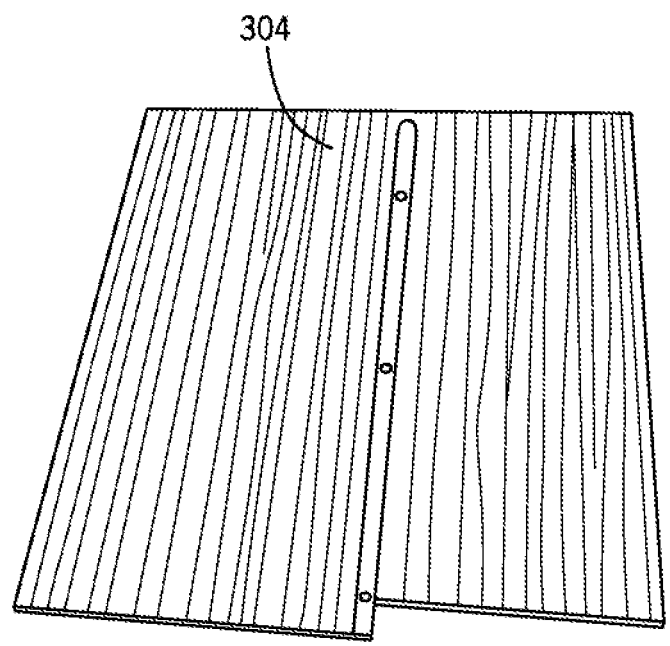
FIG. 16 is a perspective view of a component insert of the mold of FIG. 10.
Figure 17:
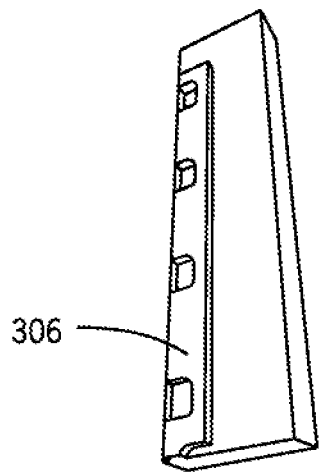
FIG. 17 is a perspective view of a component insert of the mold of FIG. 10.

Also, the mold 300 includes a cover 308, best shown in FIGS. 12-14, that is positioned over the inserts 302-306 on the mold 300 to compression mold the tile 200. The cover 308 supports an insert 310 that is releasably secured to the cover 308 and that provides the desired appearance and functionality to the rear surface of the tile 200, as shown in FIGS. 12 and 13.

Benefits of Flat Roofing Tile 200:
1. 1st in composites Image insert Panel Design allows for infinite number of images and widths
2. 1st ever use of Image Insert tooling technology allows for changing from staggered to non-staggered imaging, or from slate to shake within the same tooling, or even other imaging, allowing for quick changeovers and lower tooling cost from product line to product line. For example, running shake and slate separate tooling would run around $250,000 for our process. The Image insert technology lowers that cost to $135,000 for both sets. For an injection molding comparable tooling for 2 lines would be in excess of $2,000,000 for two profiles. Our Image Insert technology would lower tooling cost to about $1,100,000.
3. 1st ever in composite roofing product using Cast Image Insert technology allowing for "Real" images from mother nature such as true wood imaging or slate imaging giving our products the true to life look verses previous molds that require computer designing and metal machining of the image which is never true to mother nature's look. The Cast Image Insert makes this composite shingle the first to have real imaging from mother nature.
4. Image Insert technology allows for quick change for image repairs lowing lifecycle maintenance of molding tools
5. 1st ever panel design in composite compression molded roofing products.
6. 1st ever composite roofing panel that is a true taper allowing for a solid accessories to be used on gables and valleys where previous panel designs like BB light weight patent needed either a metal flashing or other closure to hide the fact it is a panel
7. 1st ever non nail through tab for tucking under the shingle next to it for increased wind uplift.
8. 1st ever nail location on the water lock lower side of a composite roofing shingle. Add this with the under tuck tab and top nails and you have all 4 corners of the shingle being held down for superior wind performance, verses the traditional 2 fastener location on other products. This allows for increased wind performance and will lower material cost in high wind areas by not having to shrink exposure like previous products.
9. Can be installed at different exposures without modifying the panel unlike other panel designs that build in steps on the back side for alignment and strength purposes.
10. Nailing areas are solid from top to the bottom of the nail location without hollow areas like on competitive panels. This eliminates panel deflection and distortion during installation Eliminating the tattle tale marks of a fake panel by seeing deflection in the nail areas like other panels in the market Process of Manufacture for Tile 200:
if color variation is desired the color process method 1-4 will be used
Utilizes ultra-fine, i.e., 325 mesh size or smaller, and optionally 200 mesh size, particle fillers to aid in impact and strength
Utilizes proprietary binder material blend adding to strength and performance.
Material is a new and unique formulation never having been produced or sold before.

Benefits of Compression Insert Mold:
1. 1st ever compression molded shingle design with insertable imaging tooling. This allows for quick repairs in imaging and also image changes using the same tooling which greatly reduces mold cost from product to product line. For example, the same tool base could run the following bolt in and out images. Hand split shake, rough sawn shake, slate, concrete tile etc. Saving hundreds of thousands of dollars in tooling costs.
2. 1st ever compression molded shingle and possibly injection molded shingle with modular tooling design allowing for quick and efficient mold maintenance. For example after so much run time a mold will begin to flash from wear and tear. Instead of building a completely new tool set spending a hundreds of thousands dollars we would actually unbolt the damaged area and replace them. So instead of 8 weeks of having new molds made we can unbolt and bolt in quick repairs using in stock shelf items in an afternoon with an overall estimated cost of 5 to thousand dollars for the entire tooling set repair saving time and money.
3. 1st ever compression molded shingle and possibly injection molded shingle using cast image inserts. The casting process allows for true to life imaging. This can be done using bronze, aluminum, steel or other materials. This can also be a machined image insert verses cast.
4. 1st ever molded shingle using a non-nail through under tuck tab locking down the shingle corner
5. 1st ever molded shingle with lower water lock fastening location locking down all four corners when installed.
6. 1st ever shingle panel design allowing for a solid accessory shingle eliminating the need for fake accessories that are normally not used with slate or shake installations making our design the most realistic looking panel design on the market.
7. 1st ever panel design to meet all testing criteria where the formulation can be made from 100% recycled polymer material.

Various other alternatives are contemplated as being within the scope of the following claims particularly pointing out and distinctly claiming the subject matter regarded as the invention.

The invention claimed is:

1. A method for providing color variation in the formation of a roofing tile material, the method comprising the steps of:
   a. providing a color variation device including a feed throat having a hopper at an inlet end thereof, an outlet end thereof opposite the hopper, a first color feeder secured to the feed throat at a first point between the inlet end and the outlet end, and a second color feeder secured to the feed throat at a second point different from the first point between the inlet end and the outlet end,
   wherein the outlet end is attached to an extruder;
   b. charging the hopper with a non-color material;
   c. introducing a first color material having a first color to the first color feeder at the first point along the feed throat;
   d. introducing a second color material having a second color to the second color feeder at the second point along the feed throat; and
   e. operating the extruder to draw the non-color material, the first color material, and the second color material into the feed throat under the influence of gravity and then through the extruder to produce a roofing material,
   wherein a location of the first and second points is selected to provide a customized color pattern or appearance in the roofing material.

2. The method of claim 1 wherein the feed throat further comprising a mixer section disposed below the first color feeder and the second color feeder, and the method further comprises mixing the first color material, the second color material, and the non-color material in the mixer section of the feed throat.

3. The method of claim 1 wherein the first color material and the second color material are pre-colored pellets.

4. The method of claim 1 further comprising heating the non-color material, the first color material, and the second color material as they move through the extruder.

5. The method of claim 1 further comprising the step of monitoring the non-color material and the first and second color materials with a proximity switch positioned on the feed throat as the non-color material and the first and second color materials mix to form a mixed material within the feed throat, and dispensing the mixed material into the extruder when the mixed material reaches a predetermined height within the feed throat as monitored by the proximity switch.

6. The method of claim 1 further comprising the step of attaching the first and second color feeders to the feed throat by attaching a bracket to each of the first and second color feeders and engaging each of the respective brackets with a respective complementary structure on the feed throat.

7. A method for providing color variation in the formation of a roofing tile material, the method comprising the steps of:
   a. providing a color variation device including a feed throat having a hopper at an inlet end thereof, an outlet end thereof opposite the hopper, a first color feeder releasably secured to a first point of the feed throat between the inlet end and the outlet end, and a second color feeder releasably secured to a second point of the feed throat different from the first point between the inlet end and the outlet end, wherein the outlet end is in communication with an extruder;
   b. introducing a non-color material to the hopper;
   c. introducing a number of color materials to the first and second color feeders;
   d. mixing the non-color material and the number of color materials in the feed throat to produce a mixed material;
   e. operating the extruder to draw the mixed material into the feed throat under the influence of gravity and then through the extruder to produce a roofing material; and
   f. heating the mixed material as it passes through the extruder,
   wherein a location of the first and second points is selected to provide a customized color pattern or appearance in the roofing material.

8. The method of claim 7 wherein the number of color materials are pre-colored pellets.

9. The method of claim 7 wherein introducing the number of color materials comprises introducing a color pellet having a first color into the first color feeder and introducing a color pellet having a second color into the second color feeder.

10. The method of claim 7 wherein the mixing of the non-color material and the number of color materials in the feed throat occurs in a mixer section of the feed throat disposed below the first color feeder and the second color feeder.

11. The method of claim 7 further comprising the step of attaching the first and second color feeders to the feed throat by fitting respective outlets of the first and second color feeders into the feed throat.

12. A method for providing color variation in the formation of a roofing tile material, the method comprising the steps of:
   a. providing a color variation device including a feed throat having a hopper at an inlet end thereof, a first color feeder releasably secured to the feed throat at a first height, a second color feeder releasably secured to the feed throat at a second height different from the first height, and an outlet end thereof attached to an extruder, wherein the first and second heights are defined between the inlet end and the outlet end;
   b. introducing a non-color material to the hopper;
   c. introducing a number of color materials to the first and second color feeders;
   d. operating the extruder to draw the non-color material and the number of color materials into the feed throat under the influence of gravity, where the non-color material and the number of color materials mix to form a mixed material, and then through the extruder to produce a roofing material; and
   e. heating the mixed material as it passes through the extruder,
   wherein a location of the first and second heights is selected to provide a customized color pattern or appearance in the roofing material.

13. The method of claim 12 wherein the number of color materials are pre-colored pellets.

14. The method of claim 12 wherein introducing the number of color materials comprises introducing a color pellet having a first color from the first color feeder to a first point along the feed throat and introducing a color pellet having a second color from the second color feeder to a second point along the feed throat.

15. The method of claim 12 further comprising the step of monitoring the non-color material and the first and second color materials with a proximity switch positioned on the feed throat between the color feeders and the outlet end and dispensing a mixture of the non-color and first and second materials into the extruder when the mixture reaches a set height within the feed throat as monitored by the proximity switch.

16. The method of claim 12 further comprising the step of attaching the first and second color feeders to the feed throat by fitting respective outlets of the first and second color feeders into the feed throat or alternatively attaching a mechanical device to a body of each of the first and second color feeders and engaging each of the mechanical devices with a respective complementary structure on the exterior of the feed throat.

* * * * *